May 4, 1965  J. KAUFMANN  3,182,207
REVERSIBLE DECIMAL COUNTER
Filed May 18, 1962  6 Sheets-Sheet 1

INVENTOR.
JOHN KAUFMANN
BY Edward A. Robinson
ATTORNEY

May 4, 1965 J. KAUFMANN 3,182,207
REVERSIBLE DECIMAL COUNTER
Filed May 18, 1962 6 Sheets-Sheet 2

INVENTOR.
JOHN KAUFMANN
BY
Edward A. Robinson
ATTORNEY

May 4, 1965
J. KAUFMANN
3,182,207
REVERSIBLE DECIMAL COUNTER
Filed May 18, 1962
6 Sheets-Sheet 4
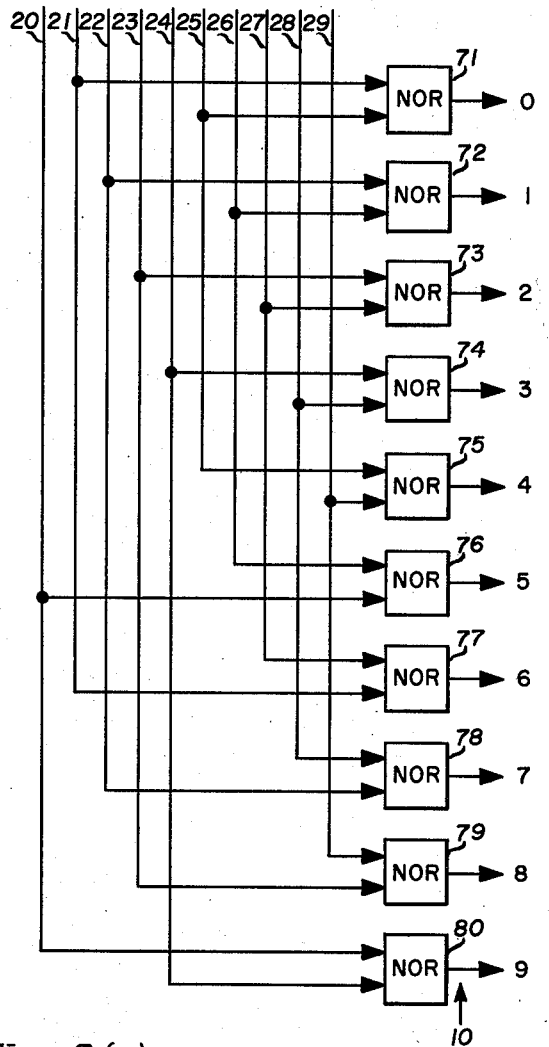
Fig_2(c)
INVENTOR.
JOHN KAUFMANN
BY
Edward A. Robinson
ATTORNEY

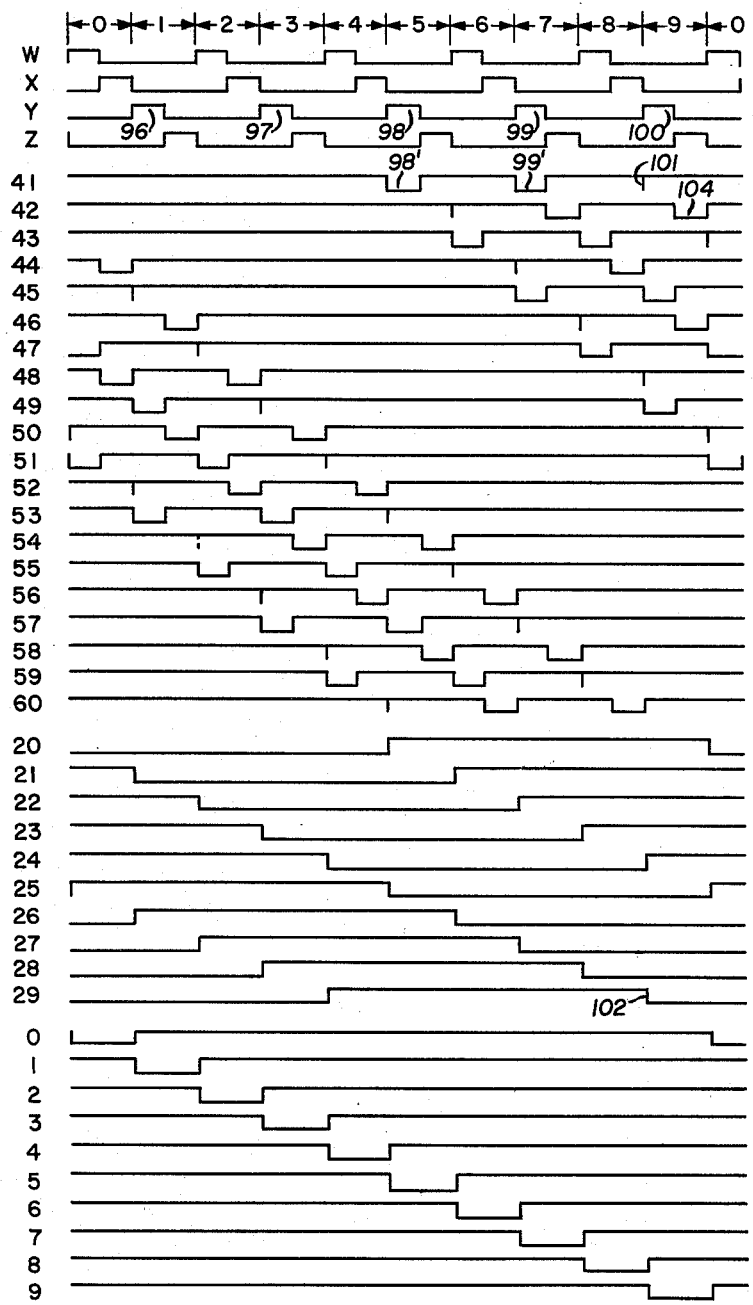
Fig_5

United States Patent Office 3,182,207
Patented May 4, 1965

3,182,207
REVERSIBLE DECIMAL COUNTER
John Kaufmann, Sunnyvale, Calif., assignor to General Precision, Inc., Binghamton, N.Y., a corporation of Delaware
Filed May 18, 1962, Ser. No. 195,743
7 Claims. (Cl. 307—88.5)

This invention relates to circuits for reversibly counting signals which may occur at varying rates in either a direct sequence or a reversed sequence, and more particularly, this invention relates to counting stages which are decimal in character and which may be tandemly coupled to provide output signals that are coded to represent decimal orders of digits. This invention is an improvement upon a binary coded circuit disclosed in a co-pending patent application of this inventor, Serial No. 156,795, entitled "Reversible Counter," and filed December 4, 1961, now Patent No. 3,132,262, granted May 5, 1964.

The counting circuit of this invention may be useful in a device such as an optical interferometer system for making absolute measurements. Such a device is the subject of Patent No. 2,977,841 granted to John Kaufman and W. L. Hayes on April 4, 1961. This measuring device includes an anvil for supporting the object to be measured and a movable head which may close down upon the anvil or the object resting thereon. To make a measurement, interfering light is optically sensed to generate electrical signals which are counted as the head moves upwardly from the anvil surface, and thence moves downwardly upon the article placed thereon. As the head moves upwardly, the generated signals are counted in a forward direction, and as the head moves downwardly, the signals are counted in a reverse direction, such that the net count will be representative of the linear thickness of the object resting upon the anvil.

The signals to be counted include waves which are substantially in quadrature phase relation to each other. The waves may be converted into square waves by trigger or flip flop circuits, or by amplifying and clipping the sine waves. The square waves to be counted may not have a definite frequency of recurrence, and in practice may recur at a rate as great as 100 megacycles, or when the head becomes stationary, the signal rate may fall to zero (steady state condition). Conventional counters which have been devised heretofore may include logical switching networks to supply "up" or "down" pulses which in turn are used to drive conventional counters. However, a logical switching network may impose a limit upon the rate of recurrence of the up-down pulses, and more especially the signal rate must be limited when the input signals tend to jitter about a transition point. For example, when a decimal circuit counts to a value of 999 the next successive pulse will cause all of the decimal digits to change and record a count of 1,000. If the pulses tend to jitter between the count of 999 and 1,000, the counter may become unstable. Prior art counters have eliminated the instability by providing a region of uncertainty which must be fully traversed in each direction before an appropriate "up" pulse or "down" pulse will appear. Although the region of uncertainty will stabilize the counter, such an arrangement has been found to be undesirable in certain applications and particularly, in the interferometer measuring device of Patent 2,977,841, supra.

It is an object of this invention to provide an improved decimal circuit for reversibly counting input signals which are shifted in phase with respect to each other and which may occur at any rate ranging from zero or a steady state to a high rate of the order of 100 megacycles.

A further object of this invention is to provide an improved decimal counting stage for receiving square wave signals shifted in quadrature with respect to each other and for generating corresponding square wave output signals similarly shifted in quadrature but having a rate of recurrence equal to one tenth of the rate of the input signals.

Another object of this invention is to provide an improved decimal counter of several stages using gate inverter circuits which may include high speed components for the first or least significant counting orders but which may be constructed of less expensive and slower speed components for subsequent stages of the more significant orders; and more particularly, it is an object to use similar NOR circuits for the various gates and inverter circuits of the system to effect an economy of manufacture.

Numerous other objects and advantages will be apparent throughout the progress of the specification which follows. The accompanying drawings illustrate a certain exemplary embodiment of the invention and the views therein are as follows:

FIGURE 1 is a circuit diagram of the decimal counter of this invention;

FIGURE 2 indicates the manner of assembling FIGURES 2(a), 2(b), and 2(c) which, when placed together as indicated, will constitute a diagram of the circuit of each of the counting stages indicated by the blocks in FIGURE 1;

FIGURE 5 is a graphical representation of the signals occurring on the various leads of the circuits of FIGURES 2(b) and 2(c).

Figures 1, 2:
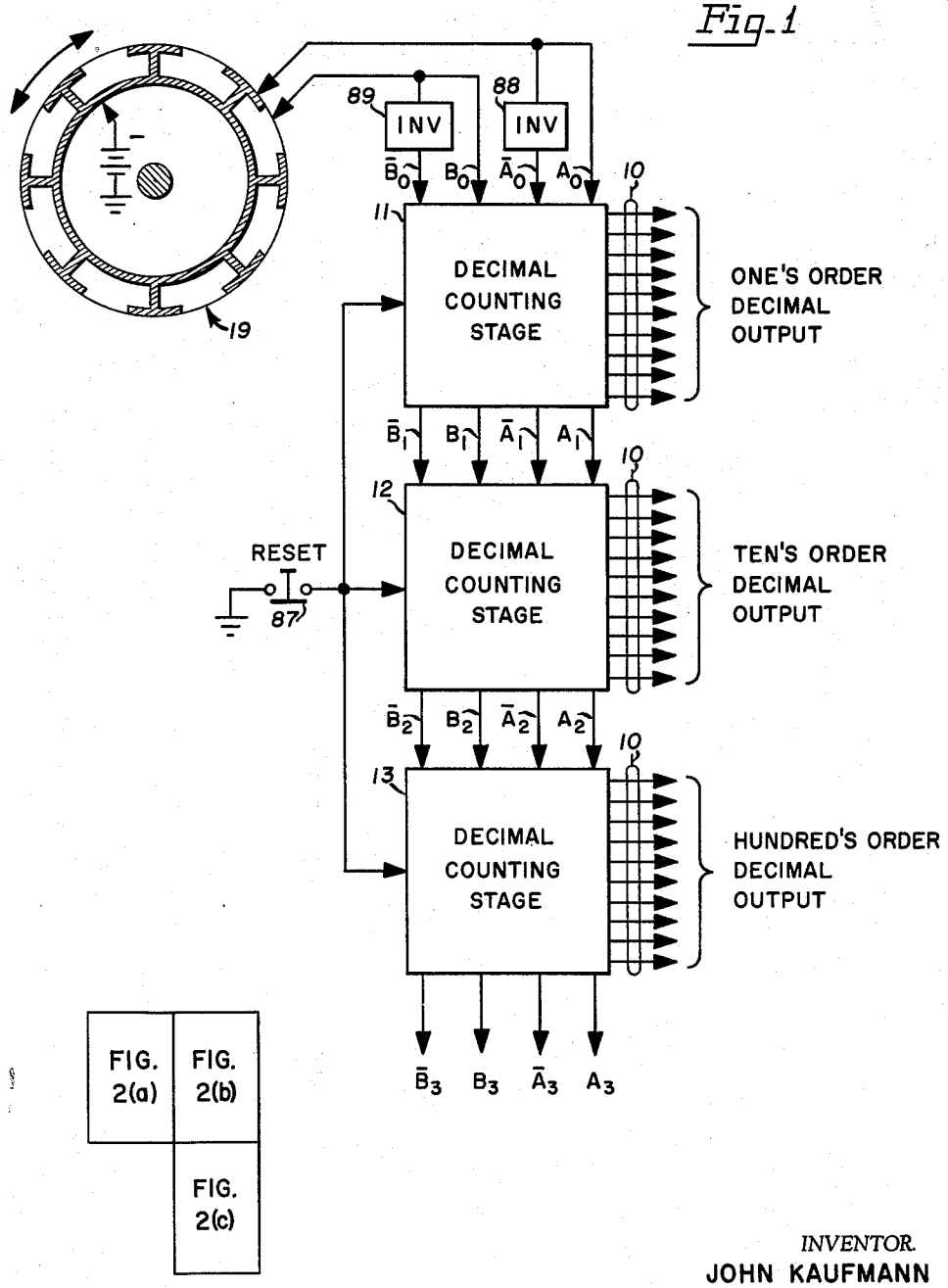

Briefly stated, according to a preferred embodiment of this invention, a reversible counter includes several decimal counting stages 11, 12 and 13. Each counting stage receives quadrature square waves at four input terminals and similar quadrature square waves are generated at four output terminals for the next counting stage. A decimal output is provided by appropriate signals at selected ones of output terminals 10 which are shown more specifically as output terminals 0 to 9, FIGURE 2(c). A first series of gate inverter circuits 30 through 37 are coupled to receive the input signals from terminals $A_0$, $B_0$, $\overline{A}_0$ and $\overline{B}_0$ will pass asymmetrical square waves of twice the period of the input signals to inverter circuits 26 through 29. The double period square waves are coupled to another group of gate inverter circuits shown in FIGURE 2(b) via leads W, X, Y and Z. The gate inverter circuits of FIGURE 2(b) are arranged in sub-groups of three circuits each such that circuits 41 through 60 constitute activating or switching gates, and circuits 61 through 70 constitute latching circuits. The latching circuits 61 through 70 are arranged in pairs, each of which may be likened to a flip flop or trigger since one of the circuits of each complementary pair will be in a state of conduction while the other is in a state of non-conduction. Selected ones of the latching gate inverter circuits provide square wave signals at output terminals $A_1$, $B_1$, $\overline{A}_1$ and $\overline{B}_1$, which are similar in character to the input signals $A_0$, $B_0$, $\overline{A}_0$ and $\overline{B}_0$ but have ten times the period thereof. Further gate inverter circuits 71 through 80 are coupled to the latching circuits 61 through 70 to provide a decoding means for generating decimal output signals.

In FIGURE 1, the counting circuit is shown coupled to a commutator arrangement 19 to indicate rotatable positions of a shaft or the like. Each of the segments of the commutator 19 are electrically coupled to a slip ring and a voltage source indicated as a battery. The conductive segments are interspersed with non-conductive segments which are equal in length to the conductive segments. Pick up brushes indicated by arrows may be spaced apart a distance equal to one half of the arcuate length of the conductive or non-conductive segments of the commutator. As the commutator rotates, signals will be generated including square waves of voltage which are shifted in phase with respect to each other. The rate of recurrence of the signals depends upon the rotational rate of the commutator, and should the rotation stop, the signals will become steady state. This representation is intended to be purely schematic, and it may be appreciated that the input waves for the counter of this invention may be derived from any source and need not be associated with a commutator arrangement as shown. As indicated heretofore, this counter may be used in combination with the interferometer system of Patent No. 2,977,841, supra, wherein the square waves to be counted are derived optically and in a manner unrelated to shaft rotation or commutation.

Figure 2A:
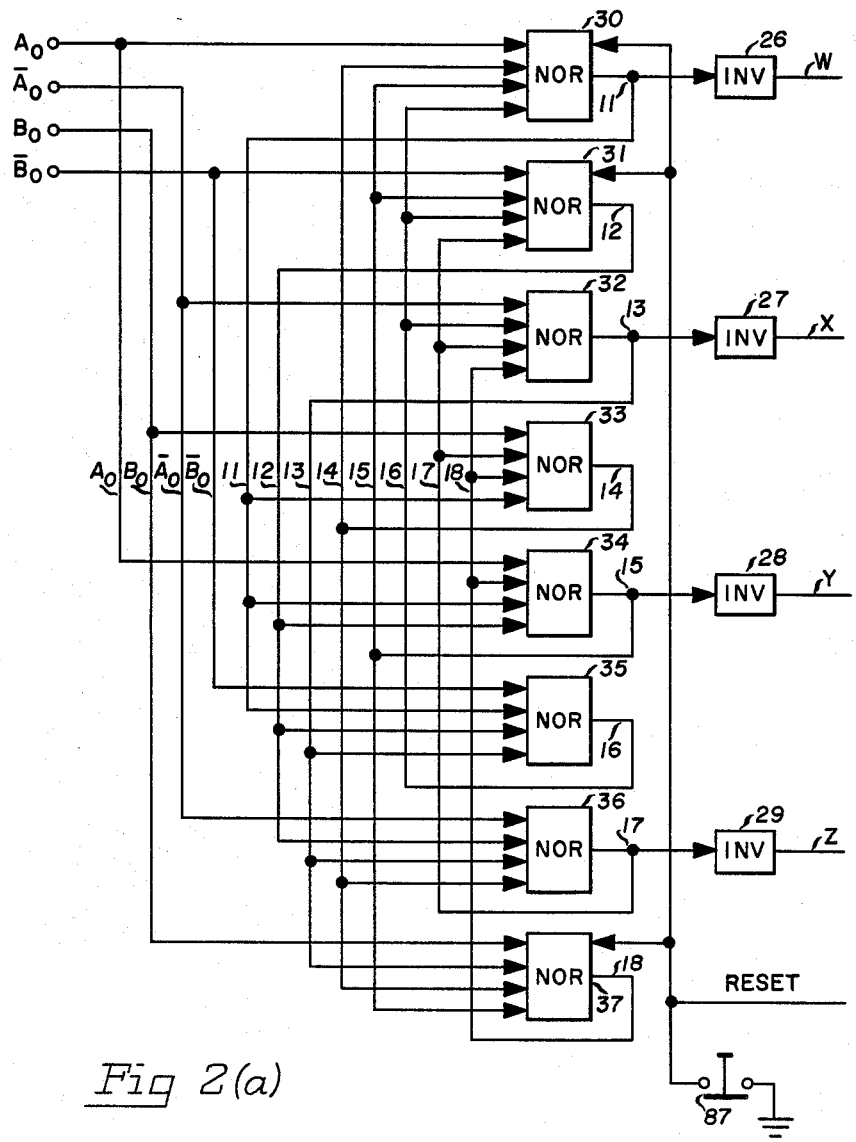
Figure 2B:
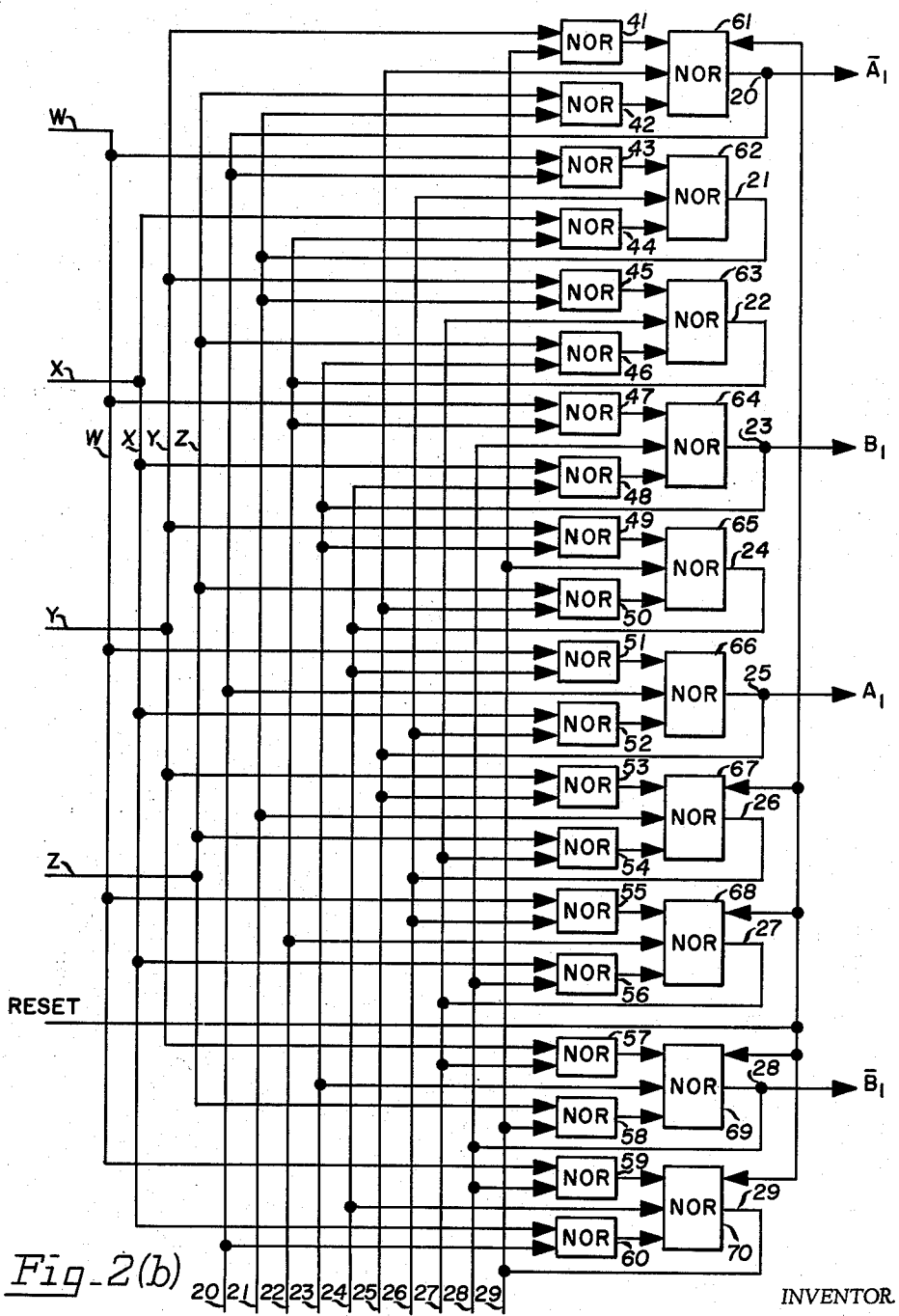
Figure 3:
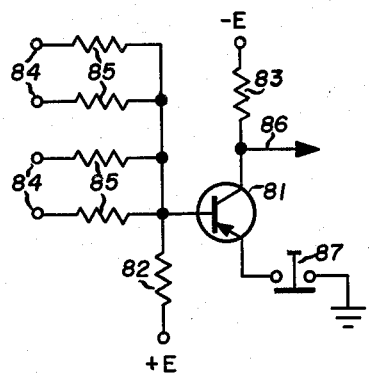
FIGURE 3 is a schematic diagram of a gate inverter circuit commonly known as a NOR circuit which is used extensively in FIGURES 2(a), 2(b), and 2(c)

The multiple input gate inverter circuits of FIGURES 2(a), 2(b) and 2(c) and the single input inverter circuits of FIGURES 1 and 2(a) may be understood with reference to FIGURE 3. Each gate inverter circuit or NOR circuit may include a PNP transistor 81 having a grounded emitter electrode, a base electrode coupled to a positive biasing potential, +E, by a resistor 82, and a collector electrode coupled to a negative biasing voltage, −E, by a load resistor 83. One or more input terminals 84 may be coupled to the base electrode of the transistor 81 by input resistors 85. During times when no signal appears at any of the input terminals 84, the transistor will be rendered non-conductive by the positive bias applied through the resistor 82 to the base electrode, and an output terminal 86 will assume the negative potential approaching −E. If an input signal in the form of a negative potential is impressed on any one or more of the input terminals 84, the transistor 81 will be biased into conduction whereupon the potential of the output terminal 86 will be reduced to substantially zero or ground potential.

As shown in FIGURE 3, the emitter electrode of the transistor 81 is coupled to ground by a normally closed switch or push button 87. When the push button 87 is actuated, the ground connection of the emitter electrode will be opened rendering the transistor 81 non-conductive. The push button 87 constitutes a reset device for establishing a zero count in the counter of this invention. To reset the counter of this invention, several selected NOR circuits of each stage must be rendered non-conductive simultaneously, and to accomplish this function, a single normally closed push button 87 couples a reset line to ground. The reset line connects to the emitter electrodes of each transistor NOR circuit which must be rendered non-conductive, and therefore, a single reset push button 87 is shared b a plurality of NOR circuits.

The NOR circuits 30 through 37 of FIGURE 2(a) each include four input terminals 84 as shown in FIGURE 3. The NOR circuits 61 through 70 of FIGURE 2(b) each include three input terminals 84 and coupling resistors 85 but otherwise may be shown in FIGURE 3. Further NOR circuits 41 through 60 and 71 through 80 of FIGURES 2(b) and 2(c) each include two input terminals 84 and coupling resistors 85. In addition to the multiple input NOR circuits, the inverter circuits 26 through 29 of FIGURE 2(a) and inverter circuits 88 and 89 of FIGURE 1 may be considered as single input NOR circuits, each having one input terminal 84 and one coupling resistor 85. The majority of the NOR circuits need not be rendered non-conductive to reset the counter, and therefore, the emitter electrodes of these transistor circuits will be solidly gounded without any circuit interrupting means such as the push button 87.

Although FIGURE 3 discloses one particular type of gate inverter circuit which would be suitable for this invention, it will be appreciated that other logical circuits may also be used. One such circuit, known as a NAND circuit, is disclosed in Patent No. 3,132,262, supra. The NOR circuit of FIGURE 3 logically functions as an OR circuit coupled to an inverter. Any input signal representative of a binary "1" which may appear as a negative voltage at one or more of the terminals 84 will render the transistor 81 conductive, and when the transistor 81 is conductive, the output voltage is reduced to zero or ground voltage (excepting for a slight drop across the transistor 81). Thus, one or more binary "1" inputs will cause a binary "0" output. The NOR circuit output will be a negative voltage (binary 1) when no signals appear at any of the input terminals.

As indicated heretofore, the input signals for each counting stage comprise square waves which are in quadrature or shifted in phase with respect to each other by 90° more or less. In FIGURE 1 a pair of square waves $A_0$ and $B_0$ may be derived from the commutator or from other input arrangements, and inverter circuits 88 and 89 may provide complementary square waves $\overline{A}_0$ and $\overline{B}_0$ which are impressed upon the first decimal counting stage 11. The wave forms of the square wave input signals are shown by the first four curves of FIGURE 4 and it may be noted that the wave $B_0$ leads the wave $A_0$ which would correspond to counter-clockwise rotation of the commutator 19 as shown in FIGURE 1. The inverter circuits 88 and 89 may be considered as a single input NOR circuit in accordance with FIGURE 3, and as such will provide inverted output waves. Thus, the waves $\overline{A}_0$ and $\overline{B}_0$ as shown in FIGURE 4 are simply the inversion of the waves $A_0$ and $B_0$.

Figure 4:
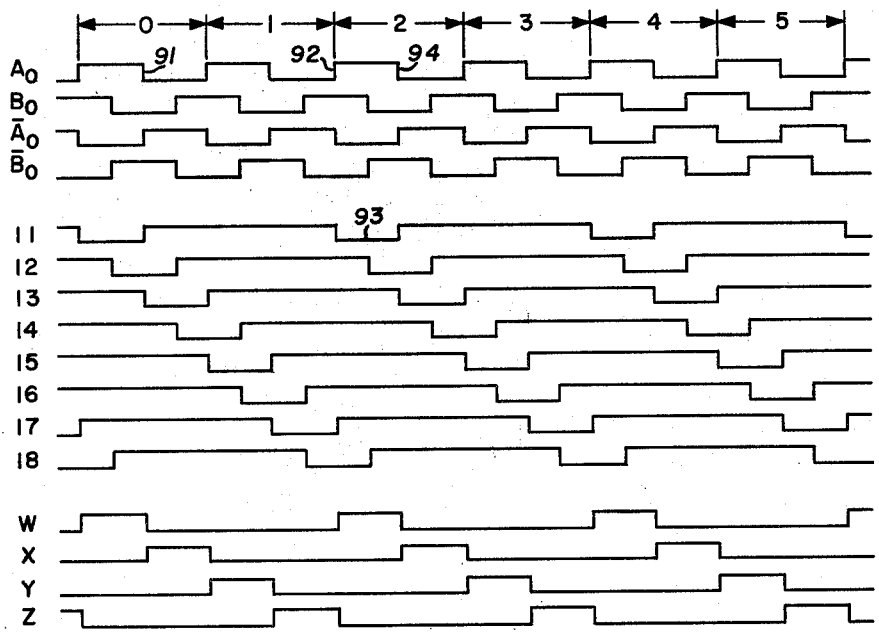
FIGURE 4 is a graphical representation of the signals occurring on various leads of the circuit shown in FIGURE 2(a)

As indicated by the dimension arrows 0, 1, 2, 3, etc. at the top of FIGURE 4, a single count will correspond to one period of the input waves. The period of a wave is normally defined as a time interval required for the wave to complete one full cycle, but it will be understood with respect to this patent application that the periods of the square wave will be dependent upon the commutator rotation or other input signal and may not necessarily have a constant rate of recurrence with respect to the passage of time. Therefore, if the counter is reset to zero, and the commutator 19 rotates counter-clockwise, the wave sequence will progress from left to right as shown in FIGURES 4 and 5. On the other hand, the commutator 19 may rotate in a reversed direction such that the sequence of waves moves from right to left, and indeed, the commutator or other input means may become static in which case all of the square waves of FIGURES 4 and 5 will likewise become static and the counter will assume a steady state condition.

An understanding of the operation of each decimal counting stage may be gained from the circuit diagram, FIGURES 2(a), 2(b) and 2(c) together with the wave sequence curves of FIGURES 4 and 5. The gate inverter or NOR circuits 30 through 37 each include four input leads of which one is directly coupled to one of the four input square waves $A_0$, $B_0$, $\overline{A}_0$ and $\overline{B}_0$. The remaining three input leads of each NOR circuit are coupled to the output terminals of three other NOR circuits. For example, the first NOR circuit 30 is coupled to receive the $A_0$ input signal together with the signals 14, 15 and 16 generated from the NOR circuits 33, 34 and 35. As indicated on FIGURE 2(a), the signals 14, 15 and 16 appear on the leads connected to output terminals of the NOR gates 33, 34 and 35. Since the NOR circuit 30 operates as an OR gate combined with an inverter, a negative conditioning signal (binary 1) applied to any of the inputs leads will result in a zero or ground potential from the output lead. The Boolean algebra equation for this condition is as follows:

(1) $\quad \overline{11} = A_0 + 14 + 15 + 16$

In the above equation, $\overline{11}$ represents the condition of the NOR circuit 30 such that the output voltage is zero when any one or more of the input signals on the right side of the equation is representative of a binary 1; and by implication, when no input signals appear on any of the four input leads, a negative voltage representative of a binary 1 will appear as an output signal 11.

As indicated above, the operation of the NOR circuit 30 is defined by Equation 1. The operation of other NOR circuits 31 through 37 of FIGURE 2(a) may be similarly defined by further Boolean algebra equations as follows:

(2) $\overline{12}=\overline{B}_0+15+16+17$
(3) $\overline{13}=\overline{A}_0+16+17+18$
(4) $\overline{14}=B_0+17+18+11$
(5) $\overline{15}=A_0+18+11+12$
(6) $\overline{16}=\overline{B}_0+11+12+13$
(7) $\overline{17}=\overline{A}_0+12+13+14$
(8) $\overline{18}=B_0+13+14+15$ FIGURE 4 indicates the wave forms of the various output signals 11 through 18 which are generated by the NOR circuits 30 through 37. Since the output voltages from the NOR gates vary between zero and a negative potential, the negative lobes or downwardly extending excursions of each curve are representative of the binary 1. It may be appreciated from an inspection of the wave forms 11 through 18 that each successive NOR circuit of FIGURE 2(a) becomes conductive to produce the negative output voltage in an overlapping sequence. For example, the wave form 12 which represents the output voltage from the NOR circuit 31 and includes a negative lobe or excursion which commences during the interval of the negative excursion of the proceeding wave 11, and continues until after the negative excursion has commenced for the next subsequent wave 13. This overlapping in the timing of the sequential waves prevents undesirable spurious voltages or spikes from being generated due to transient effects when one circuit becomes conductive and another circuit becomes non-conductive simultaneously.

Since each of the NOR circuits 30 through 37 includes three input leads coupled to three sequential signals from the curves 11 through 18, the NOR circuit will be held non-conductive throughout the overall time of conduction of the various ones of the overlapping sequential signals. In addition to the sequential signals 11 through 18, the input signals $A_0$, $B_0$, $\overline{A}_0$ and $\overline{B}_0$ provide the activation and de-activation of the circuit.

Again, considering the operation of the NOR circuit 30 and the corresponding output signal 11, it may be noted that the circuit 30 is conducting during an initial period of the "0" count. The conduction of the circuit 30 is terminated when the input signal $A_0$ changes from a "0" to a "1" at a point 91. The $A_0$ signal remains negative (binary 1) until after the signal 14 has become negative. Thence, the signal 15 becomes negative, and thence the signal 16 becomes negative. Subsequent to the negative excursion of the signal 16, the input signal $A_0$ again becomes negative and remains negative until a point 92. During the interval from points 91 to 92, at least one of the input signals to the NOR gate 30 was negative at all times, and therefore, the output signal 11 from the NOR gate 30 remains "0" throughout the entire interval. After point 92, none of the input signals to the gate 30 are negative (binary 1) and therefore, the output signal 11 commences a negative excursion 93. When the $A_0$ signal again becomes negative at a point 94, the overlapping sequence of input signals to the gate 30 is again commenced for a second cycle which will continue in the manner described above. All of the gate inverter circuits 30 through 37 of FIGURE 2(a) are similarly coupled in a quasi-ring arrangement, and all are similar in their operation.

In addition to the overlapping arrangement of the signals 11 through 18, it may be further noted that these sequential signals have twice the period of the input signals $A_0$, $B_0$, $\overline{A}_0$ and $\overline{B}_0$. Four alternate ones of the sequential signals 11 through 18 are coupled from the first group of NOR circuits 30 through 37 to the second group of NOR circuits 41 through 70 via the inverter circuits 26 through 29. The output wave from the inverter circuits are designated as W, X, Y and Z and are shown as the last four waves of FIGURE 4 and the first four waves of FIGURE 5. It may be noted that the waves W, X, Y and Z represent asymmetrical square waves each having twice the period of the input waves $A_0$, $B_0$, $\overline{A}_0$ and $\overline{B}_0$. In Boolean notation, we may write the equations:

(9) $W=\overline{11}$
(10) $X=\overline{13}$
(11) $Y=\overline{15}$
(12) $Z=\overline{17}$ The second group of NOR circuits shown in 2(b) is arranged in sub-groups of three circuits each, for example, consider the NOR circuits 41, 42 and 61. Of this sub-group, the NOR circuits 41 and 42 may be defined as activating or switching circuits and the NOR circuit 61 may be defined as a latching or holding circuit. Each of the activating circuits 41 and 42 includes two input leads, one of which is coupled to receive a square wave signal from a selected one of the inverters 26 through 29. Thus, the first lead of the NOR circuit 41 is coupled to receive the square wave Y from the inverter circuit 28, and the first lead of the NOR circuit 42 is coupled to receive the signal Z from the inverter circuit 29. The second lead of each of the activating NOR circuits is coupled to receive the output signals from the holding NOR circuits of each adjacent group. Thus, the second lead of the NOR circuit 41 is coupled to receive a signal 29 generated by the latching NOR circuit 70, and the second input lead of the NOR circuit 42 is coupled to receive a signal 21 which appears at the output terminal of the NOR circuit 62. It may be appreciated that the second group of NOR circuits 61 through 70 constitute another quasi-ring arrangement wherein the latching circuits 61 through 70 operate sequentially. The two activating NOR circuits 41 and 42 of the first group are therefore coupled respectively to the latching NOR circuits 70 and 62 which are in adjacent sub-groups to the NOR circuit 61, especially when the closed ring arrangement is considered and it is appreciated that the first latching NOR circuit 61 follows in sequence behind the final latching NOR circuit 70.

It may be further noted that the latching NOR circuits 61 through 70 are arranged in complementary pairs, for example, the circuits 61 and 66 constitute a complementary pair which may be likened to a flip flop or trigger circuit. The output signal 20 generated by the latching circuit 61 is coupled to the input terminal of the latching circuit 66, and the output signal 25 generated by the latching circuit 66 is coupled to the input terminal of the latching circuit 61. Therefore, when the circuit 61 becomes conductive and generates a negative voltage output (binary 1), this voltage prevents conduction in the latching circuit 66; and conversely, conduction by the circuit 66 will prevent conduction by the circuit 61. Similarly, the circuits 62, 63, 64 and 65 form complementary pairs with the respective circuits 67, 68, 69 and 70; and in each case, the output leads from the latching circuits of each pair is cross-coupled to an input lead of the opposite latching circuit.

The operation of the second group of NOR circuits of FIGURE 2(b) may be understood with reference to FIGURE 5. The operation of the activating circuits 41 and 42 is indicated by the curves 41 and 42 of FIGURE 5 and may be defined by the Boolean equations:

(13) $41=\overline{Y+29}$
(14) $42=\overline{Z+21}$

From Equation 13 above and from an inspection of curve 41, FIGURE 5, it may be appreciated that the NOR circuit 41 will be conductive to provide a negative output voltage (binary 1) when neither the signal Y nor the signal 29 is negative. From an inspection of the curve of the signal Y at the top of FIGURE 5, we note that the zero voltage occurs in five instances 96, 97, 98, 99 and 100 during the time of a complete count of a decimal order. During three of these instances, 96, 97 and 100, the signal 29 is negative (binary 1) and therefore, the NOR gate 41 will receive at least one negative signal maintaining a state of non-conduction during these times. However, during the intervals 98 and 99, when the curve of the signal Y is zero, the curve of the signal 29 is likewise zero, and therefore, the NOR gate 41 will become conductive to generate the negative lobes 98′ and 99′ corresponding with the intervals 98 and 99 of the Y signal. It may be further noted that a negative spike 101 may appear on the curve 41 corresponding to simultaneous signal changes when the leading edge of the lobe 100 from the input signal Y coincides with a trailing edge 102 of the non-conducting interval of the curve 29. This spike may or may not exist, but because of the latching action of the gates 61 and 66, the presence or absence of the transient spike 100 will be of no consequence. Indeed, the curves for the NOR circuits 41 through 60 include several transient voltages or spikes which may or may not exist, but in each case, these transient voltages occur at times when the respective NOR circuits 61 through 70 are latched or held by other input signals, and therefore, the existence of a transient or spurious voltage at another input terminal is of no consequence.

In considering the latching function of the NOR gate 61, the conductive states of the NOR gates 41, 42 and 66 must be considered since each furnishes signals to a respective one of the input terminals of the circuit 61. The curve of the signal 20 is seen to be negative (binary 1) during the first five counts of the decimal order, since during this interval no signal is received by any of the three input terminals of the NOR gate 61. The interval of conduction of the NOR gate 61 and the negative excursion of the signal 20 is terminated when the NOR gate 41 conducts and generates the negative lobe 98′. Conduction of the activating gate 41 will therefore cause the NOR gate 61 to become non-conductive and the holding voltage 20 will be relieved from the input of the NOR gate 66. Simultaneously, the NOR gate 52 becomes non-conductive, and since the NOR gate 51 is at that time also non-conductive, the NOR gate 66 will receive no input voltages and therefore, a negative output voltage (binary 1) will appear as signal 25. The signal 25 is coupled back to an input terminal of the NOR gate 61 and therefore, the NOR gate 61 will be rendered non-conductive during the last five counts of the decimal order. It is during this interval when spurious voltages such as 101 are likely to be generated by the NOR gates 41 and 42, but since the NOR gate 61 is being held non-conductive because of the continuous signal 25, the spurious voltages are of no consequence.

The operation of the remaining sub-groups of two activating and one latching gate each shown in FIGURE 2(b) will be similar to the operation of the gates 41 and 42 and 61, and therefore, no further discussion is necessary. The operation of the remaining activating NOR gates 43 through 60 may be defined by the following Boolean equations:

(15) $\quad 43 = \overline{W + 20}$

(16) $\quad 44 = \overline{X + 22}$

(17) $\quad 45 = \overline{Y + 21}$

(18) $\quad 46 = \overline{Z + 23}$

(19) $\quad 47 = \overline{W + 22}$

(20) $\quad 48 = \overline{X + 24}$

(21) $\quad 49 = \overline{Y + 23}$

(22) $\quad 50 = \overline{Z + 25}$

(23) $\quad 51 = \overline{W + 24}$

(24) $\quad 52 = \overline{X + 26}$

(25) $\quad 53 = \overline{Y + 25}$

(26) $\quad 54 = \overline{Z + 27}$

(27) $\quad 55 = \overline{W + 26}$

(28) $\quad 56 = \overline{X + 28}$

(29) $\quad 57 = \overline{Y + 27}$

(30) $\quad 58 = \overline{Z + 29}$

(31) $\quad 59 = \overline{W + 28}$

(32) $\quad 60 = \overline{X + 20}$

The operation of the latching NOR circuits 61 through 70 may be defined by Boolean equations as follows:

(33) $\quad 20 = \overline{25 + 41 + 42}$

(34) $\quad 21 = \overline{26 + 43 + 44}$

(35) $\quad 22 = \overline{27 + 45 + 46}$

(36) $\quad 23 = \overline{28 + 47 + 48}$

(37) $\quad 24 = \overline{29 + 49 + 50}$

(38) $\quad 25 = \overline{20 + 51 + 52}$

(39) $\quad 26 = \overline{21 + 53 + 54}$

(40) $\quad 27 = \overline{22 + 55 + 56}$

(41) $\quad 28 = \overline{23 + 57 + 58}$

(42) $\quad 29 = \overline{24 + 59 + 60}$

In the above equations, the numerals 20 through 29 pertain to the output signals from the respective latching circuits 61 through 70, and the numerals 41 through 60 pertain to the conduction states and signals from the corresponding activating NOR circuits.

It may be appreciated that each of the latching gates 61 through 70 remains non-conductive for a sequence of five decimal counts, and then becomes conductive for the next sequence of five counts. The non-conductive intervals of each of the latching NOR circuits 61 through 70 are initiated by the brief conduction interval of one of the activating NOR circuits, and the non-conductive intervals are sustained by the continued conduction of the complementary latching NOR circuit. Two activating NOR circuits are associated with each latching NOR circuit to enable the system to count in a reverse direction as well as in a forward direction. As indicated heretofore, the conduction interval 98′ (FIGURE 5) of the activating NOR circuit 41 initiates the non-conduction interval of the latching NOR circuit 61. On the other hand, when the input signals are in reversed sequence, a brief conduction interval 104 of the activating NOR circuit 42 will initiate the non-conduction interval of the NOR circuit 61. The non-conduction of the latching NOR gate 61 is initiated by one or the other of the activating NOR gates 41 or 42, and is terminated when the complementary NOR circuit 66 is caused to become non-conductive by one or the other of the activating NOR circuits 51 or 52. The complementary NOR gates 61 and 66 may be likened to a flip flop circuit since one of the gates is conductive while the other is non-conductive. The reversal of the conduction states of the complementary NOR circuits is accomplished by appropriate signals from an activating gate associated with the latching gate which is then in a state of conduction. Thus, if the NOR circuit 61 is conducting while the NOR circuit 66 is non-conducting, a signal from either of the NOR circuits 41 or 42 will reverse the conduction states of the complementary pair of gates 61 and 66. On the other hand, if the NOR gate 61 is non-conducting while the NOR gate 66 is conducting, a signal generated by either of the NOR gates 51 or 52 will cause a reversal of the conduction states of the complementary pair.

The waves generated by the NOR gates 66, 64, 61 and 69 constitute the four phase shifted square waves $A_1$, $B_1$, $\overline{A_1}$ and $\overline{B_1}$ which are the output signals of the first decimal stage and the input signals for the next successive decimal stage of the counter. Four output waves, $A_1$, $B_1$, $\overline{A_1}$ and $\overline{B_1}$ may be considered in quadrature with respect to each other even though the decimal interval is not equally divided by the phase shifted waves. It is sufficient that the various output waves $A_1$, $B_1$, $\overline{A_1}$ and $\overline{B_1}$ be substantially shifted with respect to each other to provide a proper operation of the next subsequent counting stage.

The sequential square waves 20 through 29 may be decoded to provide a decimal output signal by the third group of NOR circuits 71 through 80 shown in FIGURE 2(c). The operation of the decoding NOR circuits may be understood from a consideration of the following Boolean equations:

(43) $\quad\quad 0 = \overline{21+25}$
(44) $\quad\quad 1 = \overline{22+26}$
(45) $\quad\quad 2 = \overline{23+27}$
(46) $\quad\quad 3 = \overline{24+28}$
(47) $\quad\quad 4 = \overline{25+29}$
(48) $\quad\quad 5 = \overline{26+20}$
(49) $\quad\quad 6 = \overline{27+21}$
(50) $\quad\quad 7 = \overline{28+22}$
(51) $\quad\quad 8 = \overline{29+23}$
(52) $\quad\quad 9 = \overline{20+24}$ A voltage representative of a zero decimal count will be passed by the NOR circuit 71 at times when neither of the input signals 21 nor 25 is negative. As may be seen from the wave forms of these signals (FIGURE 5), the negative output from the signal zero occurs during the first or zero count of the counter at which time neither the signals 21 or 25 are negative. Similarly, the other decoding NOR circuits 72 through 80 will furnish a negative output signal during a corresponding decimal count. It will be appreciated that the sequential output signals from the gates of FIGURE 2(c) are decimally coded 0 through 9 to correspond directly with the decimal counts indicated by the dimensions at the top of FIGURES 4 and 5.

In FIGURE 1 the various counting stages provide decimal output signals which are designated as the one's order, ten's order and hundred's order. This arrangement is intended as exemplary, and it may be appreciated that the output signals may correspond to other decimal orders such as thousandth's order, hundredth's order, tenth's order, etc., or to any other orders of the decimal counting system—fractional, whole numbers, or combinations of decimal fractions and whole numbers. While only three counting stages are illustrated by FIGURE 1, it will be appreciated that any number of decimal counting stages may be included as required.

It may be further appreciated that the signals $A_0$, $B_0$, $\overline{A_0}$ and $\overline{B_0}$ constituting the input signals for the first counting stage will have a recurrence rate which is ten times the rate of the second counting stage or the signals $A_1$, $B_1$ $\overline{A_1}$ and $\overline{B_1}$. Similarly, the signal recurrence rate for the subsequent counting stages or the more significant decimal orders will decrease by a factor of 10 with each additional order. Therefore, a high speed counting system may be constructed using NOR circuits with high quality components or transistors for the first and least significant stage, and using slower NOR circuits having less expensive and inferior components for the more significant stages having slower recurrence rates.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A first order decimal counting stage for a counter for reversibly counting input signals having a plurality of waves which are shifted in phase with respect to each other, said counting stage including a first general group of gate inverter circuits and a second general group of gate inverter circuits, each gate inverter circuit having a plurality of input terminals and an output terminal, one of the input terminals of each of the gate inverter circuits of the first group being coupled to receive one of the waves of the input signals and the other input terminals being coupled to the output terminals from other gate inverter circuits of the first group, the gate inverter circuits of the second group being arranged in sub-groups of three circuits each wherein two of the circuits constitute activating gate inverter circuits and the third circuit constitutes a latching gate inverter circuit, each of the activating gate inverter circuits having one input terminal coupled to a selected one of the output terminals of the gate inverter circuits of the first group, each of the latching gate inverter circuits having input terminals coupled to the output terminals of the activating gate inverter circuits, the output terminals of selected ones of the latching gate inverter circuits providing a plurality of waves which are shifted in phase with respect to each other and which may constitute input signals for a higher order counting stage of the counter.

2. A first order decimal counting stage for a counter for reversibly counting input signals having a plurality of waves which are shifted in phase with respect to each other, said counting stage including a first general group of gate inverter circuits and a second general group of gate inverter circuits, each gate inverter circuit having a plurality of input terminals and an output terminal, one of the input terminals of each of the gate inverter circuits of the first group being coupled to receive one of the waves of the input signals and the other input terminal being coupled to the output terminals from other gate inverter circuits of the first group, the gate inverter circuits of the second group being arranged in sub-groups of three circuits each wherein two of the circuits constitute activating gate inverter circuits and the third circuit constitutes a latching gate inverter circuit, each of the activating gate inverter circuits having one input terminal coupled to a selected one of the output terminals of the gate inverter circuits of the first general group, each of the activating gate inverter circuits having another input terminal coupled to the output terminal of a selected one of the latching gate inverter circuits, said latching gate inverter circuits having two input terminals coupled respectively to the output terminals of the activating gate inverter circuits associated therewith, each of said latching gate inverter circuits having a further input terminal coupled to the output terminal of another of said latching gate inverter circuits, the output terminals of selected ones of the latching gate inverter circuits providing a plurality of waves which are shifted in phase with respect to each other and which may constitute input signals for a higher order decimal counting stage of the counter.

3. A decimal counting stage in accordance with claim 2 wherein the latching gate inverter circuits of the second general group are coupled together in complementary pairs, the output terminal of each latching gate inverter circuit being coupled to one of the input terminals of the other gate inverter circuit of the complementary pair whereby a signal generated by either of the latching gate inverter circuits in a first conduction state will be passed to and will hold the other gate inverter circuit of the complementary pair in a second conduction state.

4. A decimal counting system for reversibly counting input signals including a plurality of square waves which are shifted in phase with respect to each other, said system including a first group of gate inverter circuits and a second group of gate inverter circuits, said first group of circuits being operable to generate square wave signals which have a period equal to twice the period of the input signals, said second group of gate inverter circuits being operable to generate square wave output signals having a period which is five times the period of the square waves generated by the first group of gate inverter circuits, said second group of gate inverter circuits being arranged in sub-groups having both activating gate inverter circuits and latching gate inverter circuits, each of said activating gate inverter circuits being coupled to receive signals generated by the first group of gate inverter circuits, each of said latching gate inverter circuits being coupled to receive signals from the activating gate inverter circuits, said latching gate inverter circuits being inter-connected in complementary pairs whereby only one of the latching gate inverter circuits of each complementary pair may be in a state of conduction.

5. In a counting system, a plurality of gate inverter circuits arranged in groups of three circuits each, each of the gate inverter circuits having a plurality of input terminals and an output terminal, two gate inverter circuits of each group being activation circuits and the other gate inverter circuit being a latching circuit, the output terminal of each activation circuit being coupled to one of the input terminals of the latching circuit of the respective groups, said latching circuits being coupled together in complementary pairs with the output terminal of each latching circuit being coupled to one of the input terminals of the compementary latching circuit whereby conduction in one of the latching circuits will inhibit conduction in the complementary latching circuit, said activation circuits each having one input terminal coupled to receive an input signal and having another input terminal coupled to the output terminal of an adjacent latching circuit.

6. In a decimal counting system, 30 gate inverter circuits arranged in 10 groups of three circuits each, each of the gate inverter circuits having a plurality of input terminals and an output terminal, two gate inverter circuits of each group being activation circuits and the other gate inverter circuit being a latching circuit, the output terminal of each activation circuit being coupled to one of the input terminals of the latching circuit of the respective group, said latching circuits being coupled together in five complementary pairs with the output terminal of each latching circuit being coupled to one of the input terminals of the complementary latching circuit whereby conduction in one of the latching circuits will inhibit conduction in the complementary latching circuit, said activation circuits each having one input terminal coupled to receive an input signal and having another input terminal coupled to the output terminal of an adjacent latching circuit.

7. A decimal counting system for reversibly counting input signals including a plurality of square waves shifted in phase with respect to each other, said system including a first group of gate inverter circuits for generating square wave signals having twice the period of the input signals, and a second group of gate inverter circuits for generating square wave output signals having five times the period of the signals generated by the first group of gate inverter circuits, each gate inverter circuit having a plurality of input terminals and an output terminal, one of the input terminals of each of the gate inverter circuits of the first general group being coupled to receive one of the square waves of the input signals and the other input terminals of each gate inverter circuit being coupled to the output terminals of other gate inverter circuits of the first general group, the gate inverter circuits of the second group being arranged in sub-groups of three wherein two of the circuits constitute activating gate inverters and the third circuit constitutes a latching gate inverter, each of the activating gate inverter circuits having one input terminal coupled to the output terminal of one of the gate inverter circuits of the first group, each of the latching gate inverter circuits having input terminals coupled to the output terminals of the activation gate inverter circuits of the same sub-group, each of the latching gate inverter circuits having another input terminal coupled to the output terminal of another latching gate inverter circuit to form complementary pairs, said latching gate inverter circuits being operable to generate the output signals.

References Cited by the Examiner
UNITED STATES PATENTS 2,918,215 12/59 Root _____ 235—92
3,052,801 9/62 Kaufman et al. _____ 307—88.5
3,132,262 5/64 Kaufmann _____ 307—88.5

OTHER REFERENCES

IBM Technical Disclosure Bulletin, vol. 3, No. 9, February 1961, pp. 21 and 22.

MALCOLM A. MORRISON, *Primary Examiner.*